United States Patent [19]

Yukuta et al.

[11] 4,258,139

[45] Mar. 24, 1981

[54] PROCESS FOR PRODUCING FLAME-RESISTANT FOAM RESINS

[75] Inventors: Toshio Yukuta; Takumi Ishiwaka, both of Yokohama; Kiyoshi Usui, Kawasaki, all of Japan

[73] Assignee: Bridgestone Tire Company Limited, Tokyo, Japan

[21] Appl. No.: 87,838

[22] Filed: Oct. 24, 1979

[30] Foreign Application Priority Data

Oct. 25, 1978 [JP] Japan ................................ 53/131130

[51] Int. Cl.³ ............................................ C08G 18/14
[52] U.S. Cl. ................................. 521/110; 521/112; 521/163
[58] Field of Search .................. 521/110, 112, 163

[56] References Cited

U.S. PATENT DOCUMENTS

| | | | |
|---|---|---|---|
| 3,143,517 | 8/1964 | Heiss | 521/114 |
| 3,563,957 | 2/1971 | Beebe | 521/163 |
| 3,717,597 | 2/1973 | Hesskamp et al. | 521/906 |

*Primary Examiner*—Maurice J. Welsh
*Attorney, Agent, or Firm*—Sughrue, Rothwell, Mion, Zinn and Macpeak

[57] ABSTRACT

A process for producing flame-resistant foam resins is disclosed. The flame-resistant foam resin is produced by reacting an organic polyisocyanate with urea.

7 Claims, 2 Drawing Figures

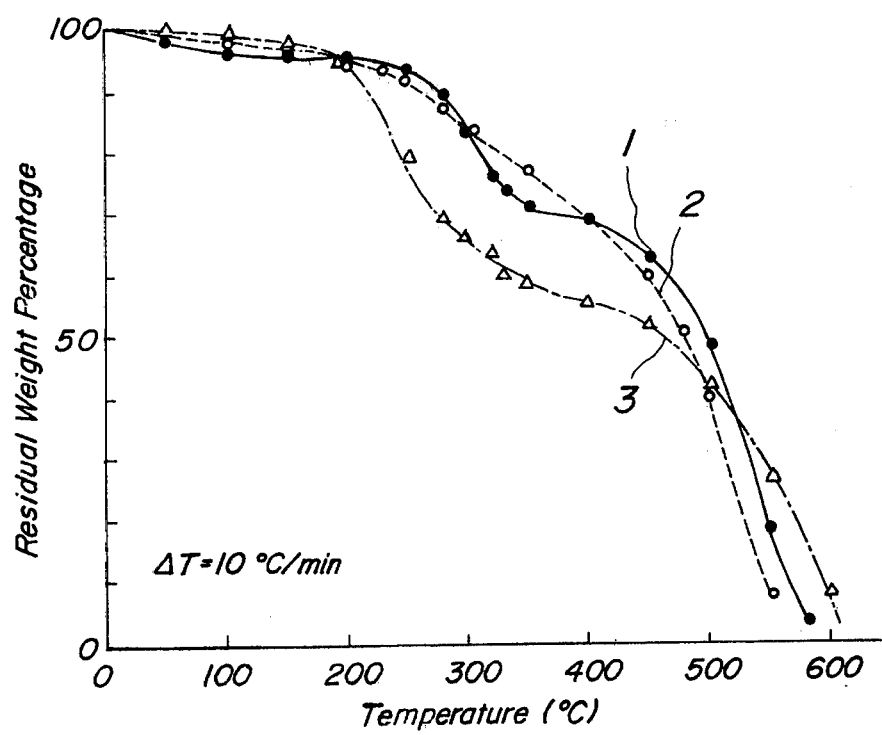

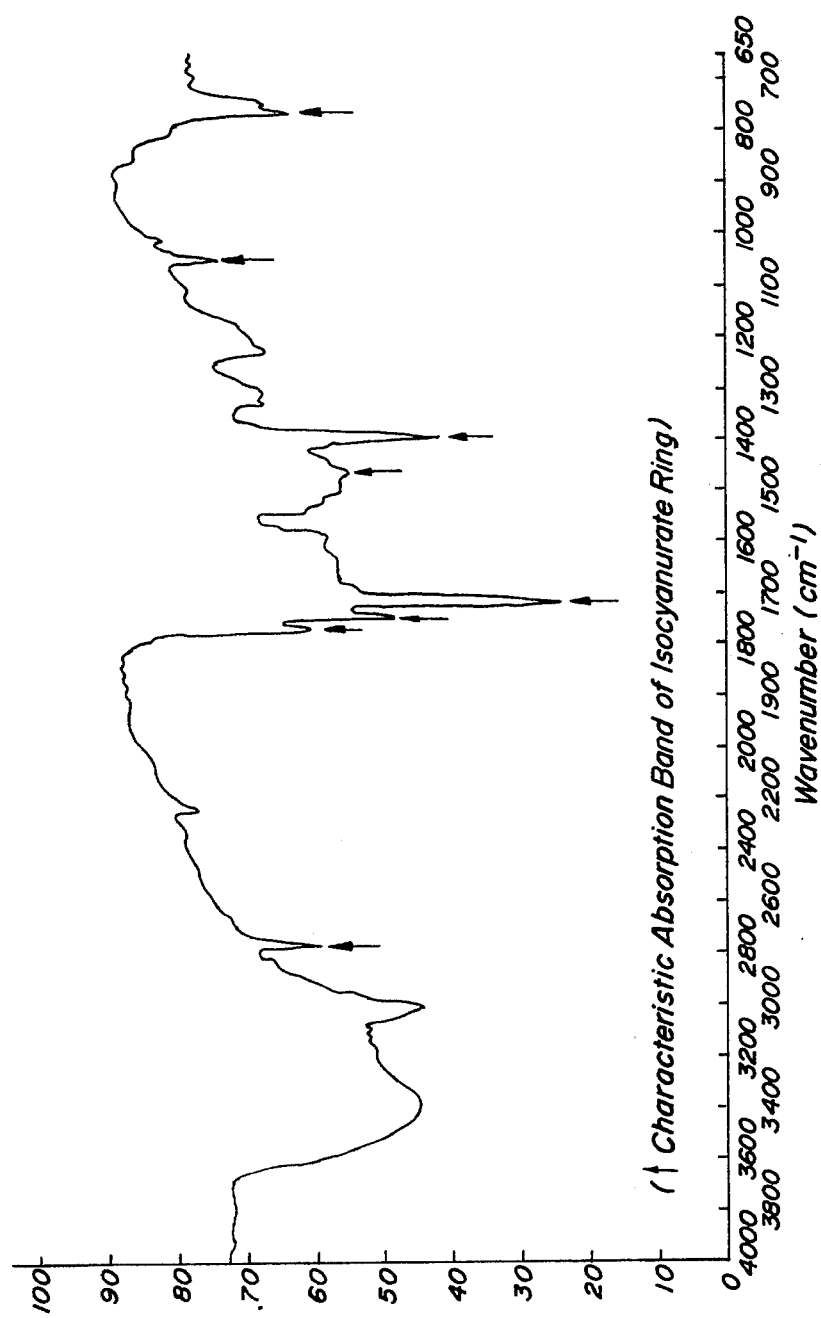

PROCESS FOR PRODUCING FLAME-RESISTANT FOAM RESINS

This invention relates to a process for producing novel flame-resistant foam resins, and more particularly to a process for producing novel and inexpensive flame-resistant foam resins from organic polyisocyanates and urea.

Hitherto, various attempts have been made to use a flame retardant in the production of flame-resistant plastic foams. For instance, it is known to use additive-type or reactive-type flame retardants such as phosphorus and/or halogen series flame retardants and the like. In this case, however, it is necessary to add a great amount of the flame retardant, so that there is caused a problem relating to the toxicity of the flame retardant and also the resulting foam becomes expensive. In case of the additive-type flame retardant, the use effect is apt to lower with a lapse of time and the physical properties of the resulting foam are adversely affected due to the act that this flame retardant serves as a plasticizer. On the other hand, the reactive-type flame retardant has a tendency of degrading the foam stability and physical properties of the resulting foam, so that it is difficult to increase the amount of this flame retardant used and as a result, the use effect is hardly developed.

Furthermore, there is known a process for producing flame-resistant plastic foam without the addition of the flame retardant, wherein an organic polyisocyanate is foamed in the presence of a polyol, a blowing agent and an isocyanate trimerization catalyst to produce a so-called polyisocyanurate foam. In this process, however, there must be used expensive catalyst and blowing agent, so that the resulting foam becomes expensive as compared with usual rigid urethane foams.

Under the above circumstances, the inventors have made various studies with respect to a process for cheaply producing flame-resistant foam resins without adding the flame retardant and as a result, the invention has been accomplished.

That is, the invention is the provision of a process for producing flame-resistant foam resins, which comprises reacting an organic polyisocyanate with urea.

According to the invention, the flame-resistant foam resin can be obtained only by reacting the organic polyisocyanate with urea, both reactants having no flame retardance, without using expensive phosphorus and/or a halogen series flame retardant, catalyst and blowing agent, so that the invention provides a novel process which cannot easily be conceived from the prior art.

The invention will now be described below in greater detail.

The organic polyisocyanate to be used in the invention is not particularly restricted and includes, for example, diphenylmethane diisocyanate, derivatives of diphenylmethane diisocyanate (e.g. crude diphenylmethane diisocyanate, polymethylene polyphenyl isocyanate and the like), phenylene diisocyanate, 1,6-hexamethylene diisocyanate, isophorone diisocyanate and the like. Among them, diphenylmethane diisocyanate and/or its derivatives are preferably used in the invention. The term "diphenylmethane diisocyanate derivatives" used herein means a crude product having an isocyanate content of 25-35% by weight, such as crude diphenylmethane diisocyanate, polymethylene polyphenyl isocyanate and the like. These organic polyisocyanates may be used alone or in admixture of two or more compounds.

When tolylene diisocyanate or its derivative is used alone as the organic polyisocyanate, the flame-resistant foam resin aiming at the invention cannot be produced as mentioned below (see Comparative Examples 1 and 2). The reason is not clear, but it is suggested this is due to the fact that the reaction mechanism using the diphenylmethane diisocyanate system is different from that using the tolylene diisocyanate system because both the reaction systems produce different reaction products, respectively. Therefore, tolylene diisocyanate or its derivative (e.g. crude tolylene diisocyanate) should be used together with another organic polyisocyanate, particularly diphenylmethane diisocyanate or its derivative. The term "crude tolylene diisocyanate" used herein means a crude product having an isocyanate content of 30-40% by weight.

As to the reaction mechanism of the invention, it is suggested that chain growth and crosslinking reaction for the formation of isocyanurate ring are caused in the reaction of the organic polyisocyanate with urea, during which an exothermic reaction producing isocyanuric acid is caused by dimerization or trimerization of urea to liberate ammonia gas and hence the resulting resin is foamed. In the reaction system using diphenylmethane diisocyanate, it seems that the resinification accompanied with the formation of the isocyanurate ring is delicately balanced to the foaming reaction of ammonia gas generated from urea for the production of foam resins.

According to the invention, any commercially available urea may be used for the reaction with the organic polyisocyanate. The urea should be used in a chemical equivalent ratio of not less than 1.0 per the organic polyisocyanate, assuming that the chemical equivalent of urea means an equivalent per one atom of active hydrogen contained in urea (i.e. 1 mole of urea is 4 equivalent). It has been found that when the chemical equivalent ratio is not less than 1.0, an excessive amount of urea is trimerized in the reaction mixture by heating to produce isocyanuric acid, during which the liberated ammonia gas contributes to foam the resulting resin. Therefore, the foam density of the resin according to the invention may optionally be regulated by the amount of urea excessively used.

In the practice of the invention, various additives may be used in accordance with the desired properties of the resin and the production process without damaging the effect of the invention. As the additive, mention may be made of a catalyst, a polyol containing two or more hydroxyl groups in its molecule, an silicone surfactant, a plasticizer, a blowing agent, inorganic or organic filler and the like.

According to the invention, the addition order of organic polyisocyanate, urea and other additives is optional. When these ingredients are mixed and heated above 100° C. with effective stirring, the resulting mixture is fused to form a homogeneous solution, during which the foaming reaction is caused to produce the flame-resistant foam resin. According to the invention, the heating temperature is within a range of 100°–150° C., preferably 120°–150° C. When the temperature is lower than 100° C., the foaming reaction becomes very slower and is impractical, while when the temperature is higher than 150° C., the foaming reaction become too fast and cannot be controlled.

The foam resins obtained by the process of the invention are rigid foams and have various densities ranging from low density to high density in compliance with the compounding condition and exhibit flame-resistance, i.e. when the foam resin is combusted by means of a lighter or the like, it is carbonized at its surface and hardly fires.

As mentioned above, the invention provides a process for producing flame-resistant foam resins by reacting the organic polyisocyanate with urea without using expensive starting materials necessary for the production of conventional flame-resistant foams, i.e. polyol, catalyst, blowing agent, surfactant, flame retardant and the like, which has never been anticipated from the prior art, so that it is very advantageous in economy and industry.

The flame-resistant foam resins according to the invention are preferably suitable for applications requiring flame retardance, such as various thermal insulating materials, sound absorption materials, packing materials, agricultural materials, panel fillers, mold materials and the like, uses similar to those of conventional rigid foams.

Furthermore, the invention can cheaply impart flame retardance to the starting material for reaction-injection molding (RIM) which being watched in recent years.

The invention will now be described with reference to the accompanying drawings, wherein:

FIG. 1 is a graph showing a relation between residual weight percentage and temperature by thermal gravimetric analysis of the foams according to the invention and the prior art; and FIG. 2 is an infrared absorption spectrum of the foam according to the invention.

The following examples are given in illustration of the invention and are not intended as limitations thereof.

EXAMPLE 1

Thirty grams (2 equivalent) of urea was finely pulverized in a mortar and then dispersed in 151 g (1.1 equivalent) of crude diphenylmethane diisocyanate (trade name "Mirionate MR", made by Nippon Polyurethane Co., Ltd., isocyanate (NCO) content 30.7%) with stirring at room temperature. Thereafter, the dispersed solution was heated at a predetermined rising rate with sufficient stirring. When the heating temperature reached about 130° C., the foaming reaction suddenly began to start and after the reaction proceeded for a rise time of about 10 seconds, there was obtained a yellowish-gray rigid foam having rich open cells.

The thus obtained rigid foam had a foam density of about 0.2 g/cm$^3$ and was a carbonization-type flame-resistant foam resin which hardly fired when combusting by a lighter or the like.

The thermal gravimetric analysis was made in air with respect to the foam of Example 1 and usual rigid urethane foams to obtain a result showing a relation between residual weight percentage and temperature as shown in FIG. 1, wherein a curve 1 represents the foam of Example 1, a curve 2 represents an isocyanurate modified rigid urethane foam (NCO index 350) of the prior art, and a curve 3 represents a rigid urethane foam (NCO index 105) of the prior art, respectively.

As apparent from FIG. 1, the curve of the rigid foam according to the invention is similar to that of the conventional rigid urethane foam, but the thermal resistance is fairly good as compared with that of the rigid urethane foam and is substantially equal to that of the isocyanurate modified rigid urethane foam.

In FIG. 2 is shown an infared absorption spectrum of the rigid foam of Example 1. In this infrared absorption spectrum, characteristic absorption band assigned to the isocyanurate ring is remarkably observed at 1,770, 1,740, 1,720 and 1,390 cm$^{-1}$, so that it is suggested that the rigid foam according to the invention has a chemical structure constituted with isocyanuric acid produced by trimerization of urea and isocyanurate ring produced by crosslinking reaction of urea with diphenylmethane diisocyanate. This is also proved from the fact that when the rigid foam of Example 1 is subjected to Soxhlet extraction with water or acetone for 6 hours, and 5.8% by weight of isocyanuric acid is extracted from the foam and the infrared absorption spectrum of the foam after the extraction is substantially the same as that before the extraction.

EXAMPLE 2

The same procedure as described in Example 1 was repeated except that 2.0 g of a silicone surfactant for rigid urethane foam (trade name "L-5350", made by Nippon Unicar Co., Ltd.) was further added, whereby there was produced a flame-resistant rigid foam resin having relatively rich open cells of uniform size.

EXAMPLE 3

The same procedure as described in Example 2 was repeated except that 140 g of polymethylene polyphenyl isocyanate (trade name "TAPI-20", made by Kasei Up John Co., Ltd., NCO 30%) was used as the organic polyisocyanate, whereby there was produced a flame-resistant rigid foam resin having relatively rich closed cells.

COMPARATIVE EXAMPLE 1

The same procedure as described in Example 1 was repeated except that crude tolylene diisocyanate (trade name "TRC-50X", made by Mitsui Toatsu Co., Ltd., NCO 35%) was used as the organic polyisocyanate, whereby there was obtained a yellowish gray solid product without foaming.

When the solid product is subjected to Soxhlet extraction with acetone/ethanol for 6 hours, about 52.1% by weight of light yellowish powder was extracted from the solid product, from which it can be seen that the crosslinking reaction does not proceed to a satisfactory extent.

The infrared absorption spectra of the extract and residue are substantially the same and exhibit polyurea structure. From this fact, it can be seen that the reactivity and chemical structure are entirely different from those of Example 1 using diphenylmethane diisocyanate as the organic polyisocyanate.

COMPARATIVE EXAMPLE 2

The same procedure as described in Example 1 was repeated except that 140 g of tolylene diisocyanate prepolymer (trade name "SRQ-30", made by Mitsui Nisso Co., Ltd., NCO 30%) was used as the organic polyisocyanate. After the foaming reaction was suddenly caused once, the resulting foam collapsed into a yellow solid product.

The infrared absorption spectrum of this solid product is substantially coincident with that of Comparative Example 1 using tolylene diisocyanate as the organic polyisocyanate.

What is claimed is:

1. A process for producing flame-resistant foam resins, which comprises reacting at least one organic polyisocyanate selected from the group consisting of diphenylmethane diisocyanate, crude diphenylmethane diisocyanate and polymethylene polyphenyl isocyanate with urea, the urea being used in a chemical equivalent ratio of not less than 1.0 per said organic polyisocyanate, said reacting releasing ammonia gas from urea to result in said foam resins.

2. A process as claimed in claim 1, wherein said organic polyisocyanate is diphenylmethane diisocyanate.

3. A process as claimed in claim 2, wherein said derivative is crude diphenylmethane diisocyanate or polymethylene polyphenyl isocyanate.

4. A process as claimed in claim 1, wherein said reaction is carried out at a temperature of 100°–150° C.

5. A process as claimed in any one of claims 1, 2, 3 or 4, wherein said reaction is carried out in the presence of a silicone surfactant.

6. The process of claim 1, wherein the components reacted consist essentially of said at least one organic polyisocyanate and said urea.

7. The process of claim 1, where reaction is without a catalyst or blowing agent.

* * * * *